S. PRATT.
PHOTO EXPOSURE METER.
APPLICATION FILED JUNE 3, 1911.
1,039,191.
Patented Sept. 24, 1912.
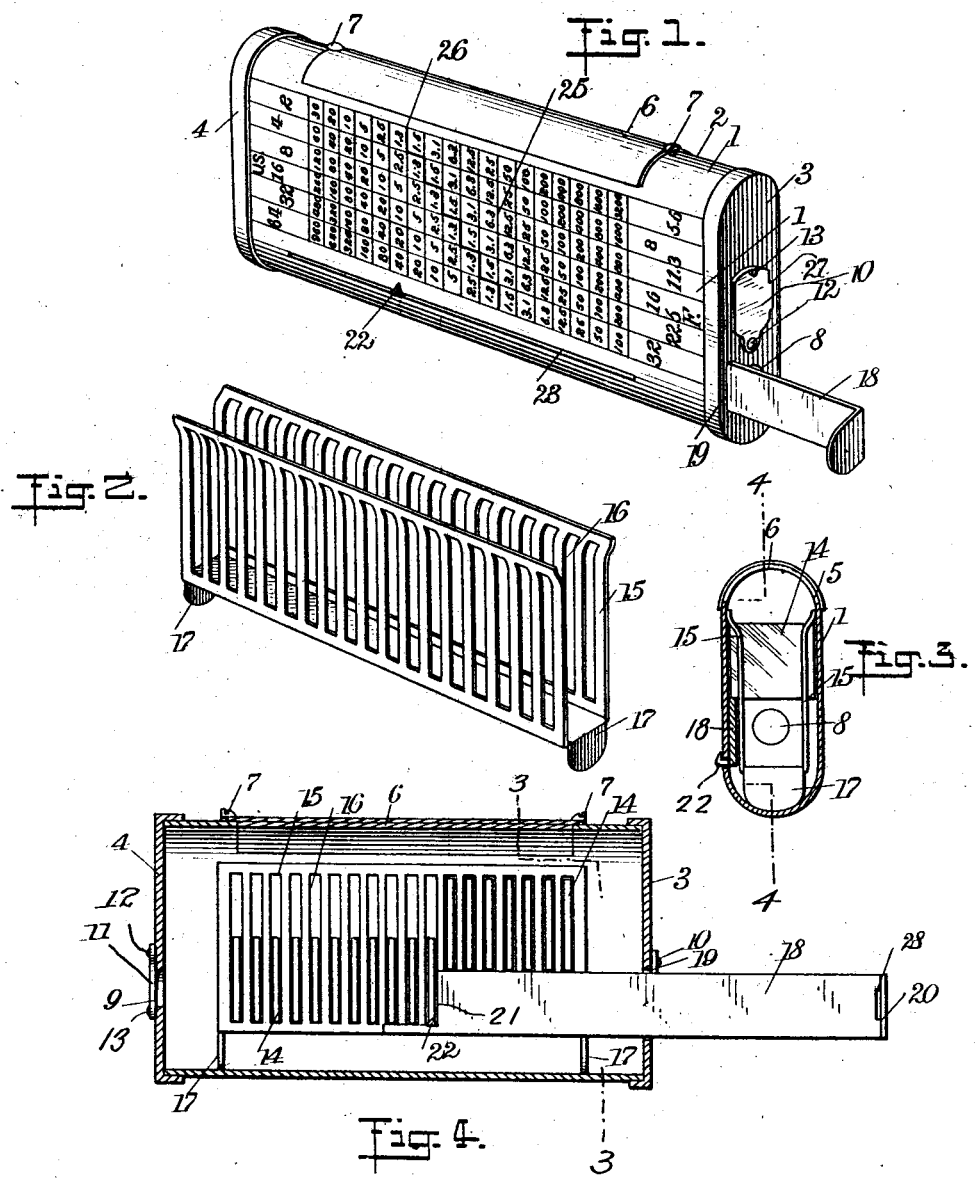

UNITED STATES PATENT OFFICE.

SEDGWICK PRATT, OF PIEDMONT, CALIFORNIA.

PHOTO-EXPOSURE METER.

1,039,191.  Specification of Letters Patent.  Patented Sept. 24, 1912.

Application filed June 3, 1911. Serial No. 631,018.

*To all whom it may concern:*

Be it known that I, SEDGWICK PRATT, a citizen of the United States, and a resident of Piedmont, in the county of Alameda and State of California, have invented a new and Improved Photo-Exposure Meter, of which the following is a full, clear, and exact description.

This invention relates to a new and improved meter for determining the length of time of exposure which is necessary to obtain a photograph showing the proper detail of an object.

If there is interposed between the eye and an illuminated object, light screens, such as pieces of transparent colored glass, so as to just obscure the light from the object, and the correct time of exposure of a photographic plate or film for such illuminated object, under such conditions, be ascertained, then a scale of exposure can be compiled for objects of various degrees of illumination; thus, if each screen obscures 50% of the light from the object, then the light transmitted to a second screen will be 50% of that coming to the first screen, and this second screen will transmit 50% of this light to a third screen, and so on for any number of successive screens. The stronger the illumination of the object, the more screens it will be necessary to interpose between the eye and the object, in order to obscure the light, and the less will be the exposure in length of time. If one screen obscures the light from the object, and the time of exposure for this object is 80 seconds, then the time of exposure for an object whose light is obscured by two of such screens would be 50% of 80 seconds, or 40 seconds, and where three screens are required, the time of exposure will be 50% of 40 seconds, or 20 seconds, and so on.

It is therefore an object of this invention to embody the above feature in a meter, whereby, by exposing successively any number of light screens between the object and the eye, until the proper degree of obscuring is obtained, the interposition of screens being in synchronism with the movement of an indicator or pointer, running along a pre-calculated scale, the times of exposure can be readily read off on this scale for different degrees of illumination of the object to be photographed, and for different apertures.

A further object of this invention is to provide a photographic meter which will be simple in construction, inexpensive to manufacture, strong, durable, readily accessible and easily operated.

These and further objects, together with the construction and combination of parts will be more fully described hereinafter and particularly set forth in the claims.

Reference is to be had to the accompanying drawings forming a part of this specification, in which similar characters of reference indicate corresponding parts in all the views, and in which—

Figure 1 is a perspective view; Fig. 2 is a perspective view of the screen rack; Fig. 3 is a vertical transverse section taken on line 3—3 of Fig. 4; and Fig. 4 is a vertical longitudinal section taken on line 4—4 of Fig. 3.

Referring more particularly to the separate parts of this invention as embodied in the form shown in the drawings, 1 indicates a casing, which may be of any suitable form, and is shown in this instance to be provided with a body portion 2 and heads 3 and 4 connected to the body portion in any suitable manner.

The casing 1 preferably has an opening 5, whereby access to the interior may be had, and this opening is normally closed by a cover 6, which projects over the margin of the opening slightly, where it is locked in position by screws 7. These screws, it will be noted, are cut off for half of their heads, so that they can be revolved to a position where the cut-off portions are faced toward each other, so that the cover can be readily inserted over the opening 5, and also so that after the cover has been once inserted, the projecting portions of the head screws can be rotated over the cover, to secure it in position. One of the heads 3 is provided with an aperture 8, which may be pointed toward the object of which it is desired to take a picture, and the other of the heads 4 may be provided with an opening 9, which may be termed the "eyepiece," and through which the user can look in observing an object. The aperture 8 and the opening 9 may be provided respectively with shutters 10 and 11 of any suitable character and movably connected to the heads in any suitable manner, as by being pivoted thereto by means of pivot pins 12. Each of the shutters may be provided with a knob 13, whereby it can be readily manipulated.

Within the casing 1, there is provided means for supporting a plurality of screens 14, which in this instance is shown in the form of a screen rack 15, which may be of any suitable character, but is preferably stamped out of a sheet of metal as indicated, with slots 16 disposed in register on the opposite upright sides of the rack, in which the screens 14 may slide. The upper ends of the sides of the rack preferably flare out slightly so as to permit the screens to be inserted in the slots, and also so that the upper edges can be secured to the sides of the casing 1. The rack 15 may be provided with legs 17, for properly supporting it within the casing 1.

The screens 14 may be of any suitable character, such that they will be transparent to light and yet absorb some of the rays of the light, and colored glass has been found to be suitable for this purpose. It will be noted that the screens 14 project through the slots 16, so that they extend beyond one of the sides at least of the rack 15, so that they can be supported in a raised position out of contact with the bottom of the rack, by means of a controller 18, which is shown in the form of a strip of metal slidingly mounted in an opening 19 in one of the heads 3, and provided at its outer end with a tab or finger-hold 20, whereby it can be readily grasped between the finger and thumb and slid back and forth. It is to be noted that the inner end of the controller 18 is provided with a cut-out portion, indicated at 21, which forms a drop, permitting the glass or other form of light-screens to fall from their raised position to their lower position, that is to say, when the rear end of the highest portion of the controller 18 passes from under each screen successively, it is permitted to drop to such a position that it rests on the bottom margins of the slots 16.

Inasmuch as the lower position of the screens 14 brings them in such a position that they will cut the line of light passing from the aperture 8 to the eye-opening 9, they will obscure to a greater or less extent, depending on the number of screens lowered, the light coming from the object being looked at, to the eye. The movement of the controller, and thus the number of screens cutting the line of sight between the apertures 8 and 9, is indicated by a pointer 22, secured to the controller in a position just to the rear of the drop in the controller, so that it will correspond to the position of the last lowered screen. This pointer projects through a slot 23 provided in the casing 1, and is adapted to indicate on a pre-calculated scale 25 located on the casing 1, the time of exposure necessary for different stops, that is to say, different-sized apertures in the camera, to obtain a photograph of an object, with the degree of detail desired, with a particular stop, and with a particular degree of illumination of the object. The scale 25, as shown, is divided into columns of figures arranged longitudinally and transversely of the casing, in a graded manner and according to a predetermined calculation based on actual trials with the instrument, and represents the times in seconds and fractions of a second necessary for various stops, to obtain the degree of detail necessary with different degrees of illumination, of the object to be photographed.

It will be seen that the longitudinal columns are headed at one end by the numerals 2, 4, 8, 16, 32, and 64, which represent the numbers of the stops corresponding to various-sized apertures under the "U. S." or uniform system. At the opposite side of the scale, are figures 5.6, 8, 11.3, 16, 22.5 and 32, which represent the number of the stops of various magnitudes, according to the "F" or focal system.

It is to be noted that the scale 25 is divided by a zig-zag line, indicated at 26, into two sections, and in the actual instrument, these sections are further distinguished by having the portion to the left of the zig-zag line in colored numerals, and the portion to the right of the zig-zag line in black numerals. It has been endeavored to bring out this distinction by making the numerals to the right of the zig-zag line somewhat heavier than those to the left of the zig-zag line. This partition is made in order to distinguish between the different sections of time on the different parts of the scale: that is to say, the light figures indicated to the left of the zig-zag line represent the time in seconds, and the black numerals or those to the right of the zig-zag line, indicate the time in fractional parts of a second; thus a black 12.5 means $\frac{1}{12.5}$ of a second, and a block 200 means $\frac{1}{200}$ of a second, and so on. A light 1.3; that is to say, to the left of the zig-zag line, means 1.3 seconds, and so on. For the purpose of locking the controller 18 in its innermost position, when not in use, the shutter 10, which closes the front aperture 8, is provided with a locking lug or extension 27, which is adapted to engage in a corresponding slot 28 in the controller 18.

The utility of the device will be readily understood when taken in connection with the above description. When it is desired to take a photograph of an object, and the effect of the light on this particular object is desired to be ascertained, so that the time of exposure in using the camera for any particular stop can be calculated, the opening 9 is held in juxtaposition to the eye, and the opening 8 directed toward the object. The controller 18 is then drawn out gradually, so that the colored light-absorbing screens 14 drop down one by one across the line of sight between the user's eye and the object. When a sufficient number of screens have fallen to make the detail on the object visible to the extent desired, the movement of the controller 18 is stopped, and the scale 25 referred to, so as to ascertain what column on the scale is indicated by the pointer 22. We will assume that we are using a camera, and desire to use an aperture corresponding to the stop 4 in the uniform system, and that the pointer stopped at the sixth column, as indicated in Fig. 1. The time of exposure necessary, then, will be 2.5 of a second in order to obtain the proper detail with this particular stop in use on the camera, and in taking the particular object viewed through the meter. In order to re-set the meter, it is merely necessary to reverse the same; that is to say, turn it upside down, and force the controller back into the casing 1.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent—

1. The combination with a casing having a line of sight therethrough, of a plurality of independent light-absorbing screens disposed in said casing above and tending to drop of their own weight into, the path of the line of sight, and a controller engaging said screens to hold the same out of the path of the line of sight, said controller being movable to successively disengage from said screens.

2. The combination with a casing having a line of sight therethrough, of an arm extending inwardly of the casing, a plurality of light-absorbing screens independently supported on said arm in a series superjacent the path of the line of sight, said arm being movable outwardly of the casing and from beneath the screens, whereby to permit the latter to successively drop into operative position.

3. The combination with a casing having a scale and a plurality of apertures therein forming a line of sight through the casing, of light screening means comprising a plurality of independent movable members adapted to obstruct in a graded manner the passage of light along said line of sight, a movable controller for said screening means for controlling the movement of said members successively across the line of sight, and a pointer movable consentaneous with said controller and coöperating with said scale to indicate the degree of obstruction of light by said screening means.

4. The combination with a casing having a line of sight therethrough, of an arm extending inwardly of the casing, a plurality of light absorbing screens independently supported on the said arm in a series superjacent the path of the line of sight, and the said arm being movable outwardly of the casing and from beneath the screens, whereby to permit the latter to successively drop into operative position, and means to lock said arm in its innermost position whereby to maintain all of the screens in inoperative position.

5. The combination with a casing having a line of sight therethrough, of a plurality of light-absorbing screens movably mounted in said casing, so as to be capable of moving into and out of the path of said line of sight, and a controller normally engaging said screens to hold the same in an inoperative position and movable to successively disengage from, and release, the same.

6. The combination with a casing having a line of sight therethrough, of a plurality of light-absorbing screens movably mounted in said casing, so as to be capable of moving into and out of the path of said line of sight, a controller for regulating the movement of said screens, the said casing being provided with a scale, divided into units of time corresponding to different apertures, and a pointer operated by said controller, adapted to indicate on said scale divisions of time corresponding to the number of screens crossing the path of said line of sight.

7. The combination with a casing having a plurality of apertures therein through which a line of sight is formed extending through the casing, of a rack in said casing, having a plurality of slots therein, light screens movably mounted in said slots, and a controller for supporting said screens in a raised position above said line of sight and movably mounted in said casing, so as to permit said screens to fall one by one across said line of sight.

8. The combination with a casing having a plurality of apertures therein through which a line of sight is formed extending through the casing, of a rack in said casing, having a plurality of slots therein, light screens movably mounted in said slots, and a controller for supporting said screens in a raised position above said line of sight and movably mounted in said casing, so as to permit said screens to fall one by one across said line of sight, said rack having its sides flaring outwardly so as to permit the insertion of said screens in said slot.

9. The combination with a casing having a plurality of apertures therein through which a line of sight is formed extending through the casing, of a rack in said casing, having a plurality of slots therein, light screens movably mounted in said slots, a controller for supporting said screens in a raised position above said line of sight and movably mounted in said casing, so as to permit said screens to fall one by one across said line of sight, said casing having an opening in the top thereof, a cover detachably connected to said casing, for closing said opening, and means for locking said cover in closed position on said casing.

10. The combination with a casing having a plurality of openings therein extending in alinement with each other to form a line of sight, of a rack in said casing, stamped from a single sheet of metal, having sides extending parallel to each other and flaring outwardly at their upper ends, said sides having vertically-disposed slots therein, said rack having legs projecting from the bottom thereof, colored glass screens movably mounted in said slots, and a controller movably mounted in said casing and adapted to support said screens out of alinement with said opening and adapted to permit said screens to fall across said line of sight in a gradual manner.

In testimony whereof I have signed my name to this specification in the presence of two subscribing witnesses.

SEDGWICK PRATT.

Witnesses:
HARRY A. KUNZ,
W. J. M. ERNST.

Copies of this patent may be obtained for five cents each, by addressing the "Commissioner of Patents, Washington, D. C."